United States Patent
Mitsui et al.

(10) Patent No.: US 9,233,861 B2
(45) Date of Patent: Jan. 12, 2016

(54) FLOCCULATION TREATMENT AGENT

(71) Applicant: HYMO CORPORATION, Tokyo (JP)

(72) Inventors: Shohei Mitsui, Tokyo (JP); Kazuoki Takeo, Tokyo (JP); Shogo Wakatsuki, Tokyo (JP); Atsushi Yonekura, Tokyo (JP)

(73) Assignee: HYMO CORPORATION, Tokyo (JP)

( * ) Notice: Subject to any disclaimer, the term of this patent is extended or adjusted under 35 U.S.C. 154(b) by 0 days.

(21) Appl. No.: 14/406,123

(22) PCT Filed: Dec. 13, 2012

(86) PCT No.: PCT/JP2012/082280
§ 371 (c)(1),
(2) Date: Dec. 5, 2014

(87) PCT Pub. No.: WO2013/183184
PCT Pub. Date: Dec. 12, 2013

(65) Prior Publication Data
US 2015/0183668 A1   Jul. 2, 2015

(30) Foreign Application Priority Data

Jun. 6, 2012 (JP) ................................. 2012-128818

(51) Int. Cl.
| | |
|---|---|
| C02F 1/56 | (2006.01) |
| B01D 21/01 | (2006.01) |
| C08F 8/12 | (2006.01) |
| C08L 39/02 | (2006.01) |
| C08L 71/02 | (2006.01) |
| D21H 21/18 | (2006.01) |
| D21C 5/02 | (2006.01) |
| D21H 17/34 | (2006.01) |
| D21H 17/37 | (2006.01) |
| D21H 17/00 | (2006.01) |
| D21H 21/20 | (2006.01) |
| C08F 126/02 | (2006.01) |
| C08F 2/32 | (2006.01) |
| D21H 21/10 | (2006.01) |
| D21H 21/16 | (2006.01) |
| C02F 11/14 | (2006.01) |
| C08L 33/26 | (2006.01) |
| C02F 101/30 | (2006.01) |

(52) U.S. Cl.
CPC . *C02F 1/56* (2013.01); *B01D 21/01* (2013.01); *C08F 2/32* (2013.01); *C08F 8/12* (2013.01); *C08F 126/02* (2013.01); *C08L 39/02* (2013.01); *C08L 71/02* (2013.01); *D21C 5/027* (2013.01); *D21H 17/34* (2013.01); *D21H 17/37* (2013.01); *D21H 17/74* (2013.01); *D21H 21/10* (2013.01); *D21H 21/16* (2013.01); *D21H 21/18* (2013.01); *D21H 21/20* (2013.01); *C02F 11/14* (2013.01); *C02F 2101/308* (2013.01); *C02F 2305/04* (2013.01); *C08L 33/26* (2013.01); *Y02W 30/648* (2015.05)

(58) Field of Classification Search
USPC ....................................................... 162/168.2
IPC ................................... C02F 1/56; D21H 21/10
See application file for complete search history.

(56) References Cited

U.S. PATENT DOCUMENTS

| | | |
|---|---|---|
| 4,814,505 A | 3/1989 | Kroener et al. |
| 5,126,395 A | 6/1992 | End et al. |
| 5,739,190 A | 4/1998 | Hartmann et al. |

FOREIGN PATENT DOCUMENTS

| | | |
|---|---|---|
| EP | 0 231 901 A2 | 8/1987 |
| JP | 05-117313 A | 5/1993 |
| JP | 05-309208 A | 11/1993 |
| JP | 10-500714 A | 1/1998 |
| JP | 2004-059747 A | 2/2004 |

OTHER PUBLICATIONS

International Search Report issued in International Application No. PCT/JP2012/082280 with Date of mailing, with English Translation.

*Primary Examiner* — Mark Halpern
(74) *Attorney, Agent, or Firm* — McDermott Will & Emery LLP

(57) ABSTRACT

A water-in-oil emulsion is a product form having many practical advantages. A vinylamine-based macromolecule having specific effects as papermaking chemicals and a flocculant is provided in the form of a water-in-oil emulsion having good storage stability and high performance as a flocculation treatment agent. Disclosed is a flocculation treatment agent including a water-in-oil emulsion of a water-soluble macromolecule that is produced by subjecting a water-in-oil emulsion of an aqueous poly-N-vinylcarboxylic acid amide solution coexisting with a polyoxyalkylene alkyl ether to hydrolysis in the presence of an acid or a base. Preferably, the polyoxyalkylene alkyl ether is added before the hydrolysis reaction.

17 Claims, No Drawings

FLOCCULATION TREATMENT AGENT

RELATED APPLICATIONS

This application is a National Phase of International Application No. PCT/JP2012/082280, filed on Dec. 13, 2012, which in turn claims the benefit of Japanese Application No. 2012-128818, filed on Jun. 6, 2012, the disclosures of which Applications are incorporated by reference herein.

TECHNICAL FIELD

The present invention relates to flocculation treatment agents. Particularly, the present invention relates to a flocculation treatment agent including a water-in-oil emulsion of a water-soluble macromolecule that is produced by subjecting a water-in-oil emulsion of an aqueous poly-N-vinylcarboxylic acid amide solution coexisting with a polyoxyalkylene alkyl ether to hydrolysis in the presence of an acid or a base.

BACKGROUND ART

At present, quaternized dialkylaminoalkylene (meth)acrylates are used as papermaking additives such as most of retention aids, drainage aids for paper boards, paper strengthening agents, and coagulants for pretreatment of papermaking stock. The reason that the above materials are most widely used may be that their cost is reasonable and they are easy to produce. However, it is known that a polyvinylamine exhibits excellent effects as a pitch controlling agent used to prevent a pitch trouble caused by an adhesive pitch. A polyvinylamine is effective also as a drainage aid for paper boards because the improvement in dewaterability during press dewatering is higher than that when the above-described acrylic-based macromolecules are used. When a polyvinylamine is used as a coagulant for dewatering of sludge, the water content of dewatered cake is reduced specifically in some cases, and it is therefore understood that it is important to use the acrylic-based macromolecules and polyvinylamine for different purposes. It is suggested that the above phenomena be due to the primary or secondary amino groups in the polyvinylamine macromolecules.

A polyvinylamine is a primary amino group-containing vinyl polymer having the simplest structure and methods such as a method in which poly-N-vinylcarboxylic acid amide is hydrolyzed with an acid or a base, a method in which poly-N-vinyl-O-t-butylcarbamate is hydrolyzed, or a method in which the Hofmann reaction of polyacrylamide is performed in the presence of a hypohalous acid and an alkali metal hydroxide are known.

In the method in which a polymer of an N-vinylcarboxylic acid amide monomer is hydrolyzed with an acid or a base, the monomer used as the raw material can be easily synthesized. In addition, a polymer with a high molecular weight can be relatively easily obtained by hydrolysis of a radical polymerization reaction product of N-vinylcarboxylic acid amide, and the method is highly safe. Therefore, this method is useful as an industrial production method.

However, an aqueous solution of a high-molecular weight polyvinylamine has high viscosity and is therefore difficult to handle. In order to utilize a high-concentration polyvinylamine, it is preferable to use the polyvinylamine in the form of a water-in-oil emulsion.

Disclosed is a method of mechanically emulsifying an aqueous solution of the polyvinylamine in the presence of an emulsifier to produce as a water-in-oil emulsion of a polyvinylamine. The viscosity of the aqueous solution of a high-molecular weight polyvinylamine is high. Therefore, in this method, the concentration of the aqueous polyvinylamine solution must be reduced to a level at which emulsification can be achieved. This method is not suitable for the purpose of utilizing a high-concentration polyvinylamine (Patent Literature 1).

One useful method of producing a water-in-oil emulsion of a polyvinylamine is to produce a water-in-oil emulsion of poly-N-vinylcarboxylic acid amide and then to hydrolyze the water-in-oil emulsion with an acid or a base.

Patent Literature 2 discloses a method of producing a water-in-oil emulsion of poly-N-vinylcarboxylic acid amide. However, in this production method, there is no description about a water-in-oil emulsion of a polyvinylamine that is obtained by hydrolysis of the above water-in-oil emulsion.

Patent Literature 3 discloses a method of hydrolyzing a water-in-oil emulsion of a copolymer of N-vinylformamide and acrylonitrile with an acid. In this method, it is necessary to use acrylonitrile as a monomer, and it is also necessary to perform hydrolysis with an acid. An ester bond in an emulsifier used for acid hydrolysis is easily cleaved by the acid. In this method, since a base cannot be used for neutralization, the stability of the emulsion is low.

Patent Literature 4 discloses a method of producing a stable water-in-oil emulsion of a polymer obtained by hydrolysis of N-vinylcarboxylic acid amide with an acid or a base in the presence of a mixture of specific emulsifiers. Also in this production method, an emulsifier having an ester bond is used, and the stability of the emulsion is low since the ester bond is easily cleaved with an acid or a base.

Patent Literature 5 discloses that, when a water-in-oil emulsion of a polymer of N-vinylamide is hydrolyzed by an acid or an alkali, an antioxidant, a reducing agent, or an aldehyde capture agent in an amount of 0.01 to 20% by mass with respect to the polymer is added to the w/o-polymer emulsion before, during, or after hydrolysis, for the purpose of improving the stability of the emulsion after the hydrolysis. In addition, there is a description that the polymerization may be performed in the presence of an emulsifier having an HLB of 9 to 20 and produced by synthesizing a reaction product of a glycidyl ether of a $C_{10}$ to $C_{22}$ aliphatic alcohol and a polyhydric alcohol and then reacting a $C_2$ to $C_4$ alkylene oxide with the reaction product.

As described above, there is no conventional method that can produce a stable water-in-oil emulsion of a polyvinylamine that is obtained by hydrolyzing a water-in-oil emulsion of poly-N-vinylcarboxylic acid amide with an acid or a base.

Patent Literature 1: Japanese Patent Application Laid-Open No. 2004-59747
Patent Literature 2: European Patent Application Laid-Open No. 0231901
Patent Literature 3: Japanese Patent Application Laid-Open No. Hei. 05-309208
Patent Literature 4: Japanese Translation of PCT International Application Publication No. Hei. 10-500714
Patent Literature 5: Japanese Patent Application Laid-Open No. Hei. 05-117313

SUMMARY OF INVENTION

Technical Problems to be Solved

Flocculants often used are powder-type flocculants with high storage stability, however in well-equipped treatment facilities or factory facilities, the powder-type flocculants can be transferred by pumping and have many advantages in that no fine particles of the flocculants are scattered and that they dissolve rapidly. Since a drying step, which is necessary for powder, is not necessary, these flocculants are advantageous in terms of energy. Accordingly, it is an object of the present invention to provide a vinylamine-based macromolecule in the form of a water-in-oil emulsion that has high storage stability and has many practical advantages. The vinylamine-based macromolecule exhibits specific effects as papermaking chemicals and flocculants. The vinylamine-based macromolecule in the form of a water-in-oil emulsion also has good performance as a flocculation treatment agent.

Solution to Problem

Extensive studies have been conducted to solve the above problems, and the following findings have been made. Thus the present invention has been completed. Specifically, it has been found that a stable water-in-oil emulsion of a vinylamine-based macromolecule can be produced by subjecting a water-in-oil emulsion of an aqueous poly-N-vinylcarboxylic acid amide solution coexisting with a polyoxyalkylene alkyl ether to hydrolysis in the presence of an acid or a base. It has also been found that when the stable water-in-oil emulsion of the vinylamine-based macromolecule is used as a papermaking additive or a sludge dewatering agent, excellent effects are obtained. A surfactant used in the present invention is a polyoxyalkylene alkyl ether. Since this surfactant resists decomposition by an acid or a base, any of an acid and a base can be used for the hydrolysis. However, the surfactant exhibits its action during hydrolysis with a base.

The water-in-oil emulsion including a vinylamine according to the present invention can be used as a retention and/or drainage aid, a coagulant, a paper strengthening agent, a wet paper strengthening agent, a size fixing agent, a deinking aid, a sludge dewatering agent, a sludge settling agent, or a dye effluent treatment agent.

Advantageous Effects of Invention

The water-in-oil emulsion including a vinylamine according to the present invention uses a polyoxyalkylene alkyl ether as a surfactant during hydrolysis and therefore resists decomposition by an acid and a base, and the stability of the water-in-oil emulsion comprising the generated vinylamine is high. Since N-vinylcarboxylic acid amide is polymerized by a water-in-oil emulsion polymerization method, the degree of polymerization can be increased, and the water-in-oil emulsion has high performance as a papermaking additive or a flocculant.

DESCRIPTION OF EMBODIMENTS

First, polymerization of N-vinylcarboxylic acid amide will be described. The water-in-oil emulsion of poly-N-vinylcarboxylic acid amide according to the present invention is prepared by a method comprising: a step of mixing an N-vinylcarboxylic acid amide monomer, water, an oily material comprising a hydrocarbon immiscible with water, and a surfactant having an HLB effective to form a water-in-oil emulsion and used in an amount effective to form the water-in-oil emulsion; a step of strongly stirring the mixture to form a water-in-oil emulsion; and then a step of performing polymerization.

Examples of the N-vinylcarboxylic acid amide monomer may include N-vinylformamide, N-vinylacetamide, N-methyl-N-vinylformamide, and N-methyl-N-vinylacetamide. It is preferable to use N-vinylformamide.

Examples of the oily material comprising a hydrocarbon immiscible with water may include: paraffins; mineral oils such as kerosene, light oil, and middle oil; hydrocarbon-based synthetic oils having substantially the same properties, such as boiling point and viscosity, as those of the above materials; and mixtures thereof. The content of the oily material with respect to the total amount of the water-in-oil emulsion is 20 to 50% by mass and preferably 20 to 35% by mass.

Examples of the surfactant having an HLB effective to form a water-in-oil emulsion and used in an amount effective to form the water-in-oil emulsion may include: polyoxyethylene alkyl ether-based, polyoxyethylene alcohol ether-based, and polyoxyethylene alkyl ester-based nonionic surfactants; and macromolecular surfactants of a block type and/or a graft type having a molecular weight of 1,000 or more. Specific examples of the surfactant may include surfactants having a molecular weight of less than 1,000 and an HLB value of 2 to 10, preferably 3 to 7 such as: fatty acid esters of glycerol, for example, glycerol mono-, di-, and tri-oleates, stearates, and palmitates; fatty acid esters of sorbitan, for example, sorbitan mono-, di-, and poly-oleates, stearates, and palmitates; and ethylene oxide and/or propylene oxide adducts of the above fatty acid esters. Examples of the macromolecular surfactants of the block type and/or the graft type having a molecular weight of 1,000 or more may include a polyester block-poly(ethylene oxide) block-polyester block copolymer that is a reaction product of 12-hydroxystearic acid and poly(ethylene oxide). A combination of two or more of the above surfactants can be used. Particularly, a combination of a surfactant having a molecular weight of less than 1,000 and a macromolecular surfactant of the block and/or graft type having a molecular weight of 1,000 or more is preferably used. The amount added of the surfactant with respect to the total amount of the water-in-oil emulsion is in the range of 0.5 to 10% by mass and preferably 1 to 5% by mass.

The polymerization is performed using a radical polymerization initiator. The initiator may be any of oil-soluble and water soluble initiators, and the polymerization can be performed using any of azo-based, peroxide-based, and redox-based initiators. Examples of the oil-soluble azo-based initiator may include 2,2'-azobisisobutyronitrile, 1,1-azobis cyclohexanecarbonitrile, 2,2'-azobis-2-methylbutyronitrile, 2,2'-azobis-2-methyl propionate, and 4,4'-azobis-(4-methoxy-2,4-dimethyl)valeronitrile.

Examples of the water-soluble azo initiator may include 2,2'-azobis(amidinopropane)dihydrochloride, 2,2'-azobis[2-(5-methyl-imidazoline-2-yl)propane]dihydrochloride, and 4,4'-azobis(4-cyanovaleric acid). Examples of the redox-based surfactant may include combinations of ammonium peroxodisulfate with sodium sulfite, sodium hydrogen sulfite, trimethylamine, and tetramethylethylenediamine. Examples of the peroxide may include ammonium peroxodisulfate, potassium peroxodisulfate, hydrogen peroxide, benzoyl peroxide, lauroyl peroxide, octanoyl peroxide, succinic peroxide, and t-butylperoxy-2-ethylhexanoate.

The temperature of polymerization may be appropriately determined according to the polymerization initiator used, and the polymerization is generally performed in the range of 0 to 100° C. and particularly preferably in the range of 10 to 60° C.

A compound having a chain transfer property may be used in order to control the molecular weight. For example, 2-mercaptoethanol, 2-propanol, sodium hydrogen sulfite, sodium methallylsulfonate, sodium hypophosphite, etc, may be used.

The concentration of N-vinylcarboxylic acid amide is set appropriately and is generally in the range of 10 to 50% by mass and particularly preferably in the range of 15 to 40% by mass with respect to the total amount of the water-in-oil emulsion.

Next, the hydrolysis of poly-N-vinylcarboxylic acid amide in the water-in-oil emulsion will be described. The stable water-in-oil emulsion of polyvinylamine according to the present invention can be obtained by hydrolyzing the water-in-oil emulsion of poly-N-vinylcarboxylic acid amide with an acid or a base. An acid or a base can be selected according to the intended purpose. When it is necessary to use the water-in-oil emulsion in the presence of an acid, it is preferable to perform hydrolysis using an acid. During hydrolysis with an acid, formic acid is generated as a by-product and corrodes a production tank and a storage tank. Therefore, it is preferably to perform hydrolysis using a base.

No limitation is imposed on the acid suitable for the hydrolysis so long as the pH during hydrolysis can be made in the range of 0 to 5. Examples of the acid may include: inorganic acids such as hydrohalic acids, sulfuric acid, nitric acid, and phosphoric acid; and organic acids such as mono and dicarboxylic acids having 1 to 5 carbon atoms, sulfonic acids, benzenesulfonic acid, and toluenesulfonic acid. It is particularly preferable to use any of hydrohalic acids and hydrogen halide gases, and it is most preferable to use a hydrohalic acid. The amount added of the acid with respect to the amount of formyl groups in the polymer is within the range of preferably 0.05 to 2 equivalents and more preferably 0.4 to 1.2 equivalents.

No limitation is imposed on the base suitable for the hydrolysis so long as the pH during hydrolysis can be made in the range of 8 to 14. Examples of the base may include hydroxides of group 1 and 2a metals in the periodic table, ammonia, and alkyl derivatives of ammonia. Hydroxides of group 1 and 2a metals in the periodic table and ammonia are preferably used, and sodium hydroxide, potassium hydroxide, and an aqueous ammonia solution are most preferably used. The amount added of the base with respect to the amount of formyl groups in the polymer is preferably 0.05 to 2 equivalents and more preferably 0.4 to 1.2 equivalents.

The water-in-oil emulsion of the hydrolyzed polyvinylamine can be neutralized by any of the above described acids and bases, and it is preferable to adjust the pH within the range of 6.0 to 14.0.

The hydrolysis must be performed in the presence of a polyoxyethylene alkyl ether having an HLB within the range of 8.0 to 14.0. Examples of such a polyoxyethylene alkyl ether may include polyoxyethylene lauryl ether, polyoxyethylene stearyl ether, polyoxyethylene cetyl ether, and polyoxyethylene oleyl ether. The polyoxyethylene alkyl ether may be added during polymerization of N-vinylcarboxylic acid amide or before hydrolysis performed after the polymerization. It is preferable to use a method in which the polyoxyethylene alkyl ether is added before the hydrolysis step performed after the polymerization.

For the purpose of preventing an unintended cross-linking reaction, the hydrolysis reaction may be performed in the presence of hydroxylamine hydrochloride. Preferably, hydroxylamine hydrochloride is added before the hydrolysis performed after the polymerization.

The temperature at which the hydrolysis is performed can be appropriately selected according to the rate of hydrolysis and the time for hydrolysis. The hydrolysis is generally performed in the range of 40 to 100° C. and preferably 60 to 90° C.

Preferably, the intrinsic viscosity of the thus-obtained vinylamine in a 1 mol/L aqueous NaCl solution at 25° C. is in the range of 0.5 to 10.0 (dL/g). It is substantially difficult to produce vinylamine with an intrinsic viscosity of 10.0 (dL/g) or greater, and the intrinsic viscosity is most preferably in the range of 0.5 to 8.0 (dL/g).

After the hydrolysis, it is preferable to perform treatment for allowing the emulsion particles covered with an oil film to be easily wetted with water by adding a hydrophilic surfactant to thereby allow the water-soluble macromolecule in the emulsion to particles to be easily dissolved. Examples of the hydrophilic surfactant may include nonionic surfactants with an HLB of 9 to 15 and cationic surfactants, and specific examples include polyoxyethylene polyoxypropylene alkyl ethers and polyoxyethylene alcohol ethers.

The flocculation treatment agent will next be specifically described. The flocculation treatment agent of the present invention can be used as a sludge dewatering agent. The treatable sludge forms strong flocs when the flocculant is added to primary sedimentation raw sludge sedimented from sewage in a municipal sewage treatment plant, excess sludge sedimented from effluent from an activated sludge tank, and a mixture thereof (this mixture is generally referred to as "mixed raw sludge"). When the flocs are treated using a compression dewatering apparatus such as a belt press, a screw press, or a filter press or a dewatering apparatus such as a centrifuge or a vacuum filter, dewatering can be performed significantly effectively, and thereby a dewatered cake with low-water content can be obtained. The flocculation treatment agent is highly effective for the treatment of sludge generated when wastewater discharged from, for example, food processing, seafood processing, petrochemical, and livestock industries is subjected to biological treatment, as examples of the treatable sludge. The flocculation treatment agent used in the present invention is a cationic macromolecule including a primary amino group and is highly adsorbable to sludge particles. Strong flocs, which are not excessively large are thereby formed. Therefore, the water content of the dewatered cake is reduced, and very high sludge treatment efficiency is achieved. The weight average molecular weight of the flocculation treatment agent that is suitable for dewatering of sludge is 2,000,000 to 10,000,000 and preferably 3,000,000 to 10,000,000. If the weight average molecular weight is less than 2,000,000, flocculating force is insufficient. Even when the weight average molecular weight exceeds 10,000,000, the flocculating force does not largely change. In addition, the viscosity of the solution becomes excessively high, and the dispersibility deteriorates, so that no particular advantage is obtained. The flocculation treatment agent of the present invention is cationized by hydrolyzing N-vinylcarboxylic acid amide with an acid or a base to convert acid amide groups to amino groups. However, as for the degree of hydrolysis, i.e. the degree of amination, it is preferable for use as the sludge dewatering agent that N-vinylcarboxylic acid amide be not fully hydrolyzed so that acid amide groups remain present. This may be because of the balance between the nonionic acid amide groups and the hydrophilic primary amino groups. Therefore, the degree of amination is preferably 30 to 80% by mole and more preferably 40 to 80% by mole.

The flocculation treatment agent of the present invention can be used to treat dye effluent. Specifically, this flocculation treatment agent shows higher effect than existing flocculation treatment agents such as dicyandiamide/formalin condensate, amine/epihalohydrin condensate, and low-molecular weight (meth)acrylic-based polymers. In addition, the flocculation treatment agent of the present invention has less influence on the environment and health and is industrially useful. The amount added of the flocculation treatment agent with respect to the dye effluent is 10 to 10,000 ppm and preferably 50 to 1,000 ppm. It is effective to use an inorganic adsorbent such as bentonite or an anionic macromolecular flocculant in combination after coagulation treatment is performed using the water-soluble macromolecule of the present invention. The weight average molecular weight of the water-soluble macromolecule is 10,000 to 5,000,000 and more preferably 100,000 to 4,000,000. If the weight average molecular weight is less than 10,000, the effect of decoloring dye is insufficient. If the weight average molecular weight is higher than 5,000,000, flocculating force by so-called cross-linking adsorption becomes much higher than the function of neutralizing the surface charge of the dye molecules, i.e., the coagulation action, and this results in a reduction in the decoloring function. Therefore, the weight average molecular weight of the water-soluble macromolecule is 5,000,000 or less.

When an activated sludge mixture liquid is fed to a sedimentation tank to sediment and separate the mixture liquid, sedimentation failure may occur. This may be due to various causes. For example, an increase in BOD load due to changes in drainage causes the activated sludge to be in a bulking state or a near bulking state. In the above situation, an anti-bulking agent has conventionally been added. However, it is difficult to adjust the amount added of the anti-bulking agent. If the amount added is insufficient, no effect is achieved. If an excessively large amount is added, microorganisms in the activated sludge die or their activity decreases. To improve the above issue, it has been attempted to use a mixture of an anti-bulking agent and a cationic flocculant. The water-in-oil emulsion including vinylamine according to the present invention can also be used as a sludge settling agent.

The water-soluble macromolecule used in the present invention is easily diluted with or dissolved in water at any ratio and exhibits its effect immediately after addition. Therefore, the water-soluble macromolecule can rapidly respond to an abrupt increase in a liquid to be treated or sludge sedimentation failure during wastewater treatment, and therefore the outflow of the activated sludge to the treated water can be prevented rapidly. Since the flocs formed are dense and have excellent sedimentation and consolidation properties, solid-liquid separation can be easily performed, and therefore the outflow of the activated sludge to the treated water can be efficiently prevented by a simple operation. In addition, a high sedimentation improvement effect is achieved by addition of a small amount of the chemical, the amount used of the chemical can be reduced, and the treatment can be performed at low cost.

No particular limitation is imposed on the addition point of the water-soluble macromolecule, and the water-soluble macromolecule may be added at any point in a path from an aeration tank to a sedimentation tank. For example, the water-soluble macromolecule may be added to the aeration tank, a communication passage between the aeration tank and the sedimentation tank, or a center core portion of the sedimentation tank. A flocculation tank may be provided between the aeration tank and the sedimentation tank to add the water-soluble macromolecule thereto. When the water-soluble macromolecule is added to the aeration tank, the mixture is stirred by aeration, so that no special stirring is necessary. When the water-soluble macromolecule is added at the communication passage between the aeration tank and the sedimentation tank, the mixture is stirred sufficiently during transportation of water, so that no special stirring is necessary.

The water-soluble macromolecule may be added continuously or intermittently. The water-soluble macromolecule may be added when the sedimentability of the activated sludge has deteriorated or is expected to deteriorate.

Since the water-soluble macromolecule has a relatively low molecular weight, the product thereof may be added as it is, or the product that has been diluted with water may be added. In the present invention, when a solution of the water-soluble macromolecule dissolved in water is added, the water-soluble macromolecule reacts immediately with sludge. Accordingly, it is not necessary to provide an additional stirrer, and even when the solution of the water-soluble macromolecule is added directly to the path for liquid flow, a sufficient sedimentation promoting effect is obtained. This is preferable.

The amount added of the water-soluble macromolecule varies depending on the SS concentration of the solution to be treated. The amount added of the water-soluble macromolecule with respect to the amount of the solution to be treated is generally 1 to 50 mg/L and preferably 2 to 15 mg/L. The reduced viscosity is generally within the range of 0.1 to 6 dl/g and preferably 1 to 4 dl/g, as described above. The weight average molecular weight of the water-soluble macromolecule is 5,000 to 5,000,000 and preferably 10,000 to 3,000,000.

The flocculation treatment agent of the present invention can be used as a deinking aid used in a process of producing deinked recycled paper. In a method of producing deinked recycled pulp, first, a wastepaper stock is added to water containing an alkali such as sodium hydroxide or sodium silicate, and the wastepaper is defiberized using a pulper to obtain a pulp slurry. In the method in the present invention, it is preferable to use, as a deinking agent, a higher fatty acid or an ethylene oxide-propylene oxide adduct of a higher alcohol or a higher fatty acid in combination. When a higher fatty acid such as stearic acid is used as the deinking agent, it is preferable that calcium chloride be added upstream of a flotator to precipitate calcium stearate. Among the above deinking agents, an ethylene oxide-propylene oxide adduct of a higher alcohol can be particularly preferably used. Preferably, the deinking agent such as an ethylene oxide-propylene oxide adduct of a higher alcohol is added to a kneader. By kneading the pulp slurry and the deinking agent such as an ethylene oxide-propylene oxide adduct of a higher alcohol in the kneader, printing ink can be separated from the pulp fibers. Preferably, hydrogen peroxide is added to the pulp slurry. In this case, color components are to bleached, and the brightness of the recycled pulp can be increased. No particular limitation is imposed on the adding position of hydrogen peroxide. For example, hydrogen peroxide is added to the inlet of the kneader or a tower.

The flocculation treatment agent used in the present invention is added to the pulp slurry in the flotator or in an upstream position of the flotator. Examples of the adding position upstream of the flotator include a kneader, a tower, and a pulper. The amount added of the flocculation treatment agent with respect to the amount of the pulp slurry in the flotator is 0.5 to 500 mg/L and preferably 5 to 100 mg/L. If the amount added of the flocculation treatment agent with respect to the amount of the pulp slurry is less than 0.5 mg/L, it may be difficult to obtain a significant effect of removing ink, ash, and pitch. If the amount added of the flocculation treatment agent with respect to the amount of the pulp slurry exceeds 500 mg/L, froth is excessively generated from the pulp fibers, and the yield of the pulp may be reduced. The function of the water-soluble macromolecule used in the present invention is not the function of removing ink itself but the function of flocculating the separated ink and ash to remove them from the pulp fibers. Therefore, the deinking treatment can be performed effectively by using the water-soluble macromolecule in combination with an organic deinking agent including a higher fatty acid or an ethylene oxide-propylene oxide adduct of a higher alcohol or higher fatty acid that have an excellent ink removing function.

The flocculation treatment agent used in the present invention is added to the pulp slurry, and the resultant pulp slurry is subjected to flotation in the flotator. In the flotator, air is bubbled into the pulp slurry containing the pulp and ink. Then the ink adheres to the air bubbles, floats, and is thereby separated from the pulp. When a conventional organic deinking agent is added to separate the ink from the pulp fibers and then flotation is performed, the separated ink and ash are maintained in a dispersed state and are not easily removed. However, when the deinking aid containing the flocculation treatment agent used in the present invention is added and then flotation is performed, the separated ink, ash, and pitch are flocculated to form flocs, and the flocs adhere to the air bubbles, float, are thereby separated, and discharged to the outside of the system as froth. Water is removed, using an extractor etc., from the pulp slurry from which the foreign materials such as ink, ahs, and pitch have been removed in the flotator. Then the resultant pulp slurry is again suspended in water, and the pulp is washed using a filter. Since the removal rate of ink from the wastepaper stock of the recycled pulp produced using the flocculation treatment agent used in the present invention is high, the brightness of a paper product produced by mixing the recycled pulp is improved, and the quality of the paper product can thereby be improved. Therefore, the mixing ratio of the deinked pulp can be increased, and it is expected to reduce the papermaking cost. Examples of the applicable paper may include newsprint, medium quality paper, household paper, and paper boards. They may be added to virgin pulp or may be used alone for some applications. Since it is expected to reduce the pitch content of pulp, it is expected to reduce the frequency of the occurrence of pitch trouble during papermaking. The weight average molecular weight of the flocculation treatment agent is 1,000 to 5,000,000 and preferably 100,000 to 3,000,000.

The flocculation treatment agent of the present invention is excellent in the function of reducing adhesion of adhesive precipitates, i.e., pitch, generated during the pulp production and paper making processes described above or sticky adhesive materials such as a sizing agent, waxes, a coating binder that are used during production of recycled paper and in the form of fine hydrophobic particles to a dryer and paper. The flocculation treatment agent is also excellent in the function of reducing defects (spots brought by coagulated adhesive materials) on the surface of the produced paper after drying. Since the adhesive materials are originally hydrophobic materials, the amidine structural unit in the flocculation treatment agent according to the present invention is easily adsorbed onto the adhesive materials, and this may be effective to prevent hindrance action. Hydrogen bonds resulting from the vinylamine structural unit in the molecule may also facilitate the excellent adsorption action.

The amount of the flocculation treatment agent added to the papermaking stock is 0.005 to 0.2% by mass and preferably 0.01 to 0.1% by mass based on the mass of the dry papermaking stock. An addition method including adding the flocculation treatment agent to a papermaking stock slurry before papermaking is preferred. Since a significant effect is obtained by adding the flocculation treatment agent directly to the papermaking stock before mixing, i.e. raw material pulp that is the main cause of stains, it is more preferable to add the flocculation treatment agent to mechanical pulp or deinked pulp. For example, the flocculation treatment agent is added directly to a raw material pulp chest used for the purpose of treatment or added to an outlet tube of the raw material pulp chest rather than to a mixing chest in which various types of pulp are mixed. The molecular weight, i.e. the weight average molecular weight, of the flocculation treatment agent is in the range of 10,000 to 5,000,000. If the weight average molecular weight is less than 10,000, the adsorbability to the adhesive materials becomes low. If the weight average molecular weight is higher than 5,000,000, flocculating force becomes higher, and this is not suitable for the purpose of the present invention. The flocculation treatment agent of the present invention is cationized by hydrolyzing N-vinylcarboxylic acid amide with an acid or a base to convert acid amide groups to amino groups. When the flocculation treatment agent is used as a coagulant, the degree of hydrolysis, i.e. the degree of amination, is preferably 10 to 80% by mole, which depends on a raw material to be treated and on the intended purpose such as treatment of adhesive materials or pitch control.

The flocculation treatment agent of the present invention is added to a papermaking stock before papermaking to improve retention, drainage, or strength of dry paper. The paper product to which the flocculation treatment agent is applied may be any of general printing paper, packaging paper, and the liner and corrugating medium of corrugated paper. The pH during papermaking is 3 to 9. The amount of the flocculation treatment agent added as a paper strengthening agent with respect to the papermaking stock is 0.1 to 1% by mass and preferably 0.2 to 0.5% by mass. The amount of the flocculation treatment agent added as a drainage aid is 0.01 to 0.2% by mass and preferably 0.02 to 0.1% by mass. The addition point of the paper strengthening agent is, for example, a machine chest or a position upstream of a fan pump for adding white water. The adding position of the drainage aid is, for example, a point upstream of the fan pump for adding white water or a point upstream of a screen. Conventionally used papermaking chemicals as they are may be used together with the flocculation treatment agent without any problem.

When the flocculation treatment agent of the present invention is used for papermaking industry, the molecular weight, i.e. the weight average molecular weight, of the flocculation treatment agent is 1,000,000 to 10,000,000 and is adjusted according to the intended purpose. Specifically, when the flocculation treatment agent is used as a paper strengthening agent, the weight average molecular weight is 1,500,000 to 5,000,000 and preferably 2,000,000 to 4,000,000. When the flocculation treatment agent is used as a drainage aid, the weight average molecular weight is 3,000,000 to 10,000,000 and preferably 5,000,000 to 7,000,000. If the weight average molecular weight is less than 3,000,000, the performance for these applications is insufficient. A weight average molecular weight exceeding 10,000,000 is not preferred for the drainage aid, because it causes a deterioration in the formation of paper. The flocculation treatment agent used as a paper strengthening agent has a weight average molecular weight of generally 1,000,000 to 6,000,000 and preferably 2,000,000 to 5,000,000. A high-molecular weight flocculation treatment agent having a weight average molecular weight of 6,000,000 or more is not preferred, because it causes a deterioration in the formation of paper. The degree of hydrolysis, i.e. the degree of amination, of the flocculation treatment agent of the present invention varies depending on the raw material to be treated and papermaking conditions. When the flocculation treatment agent is used as a retention aid, the degree of amination is preferably 10 to 30% by mole. When the flocculation treatment agent is used as a drainage aid or a paper strengthening agent, the degree of amination is preferably 10 to 80% by mole.

When the flocculation treatment agent of the present invention is added to a papermaking stock before papermaking, wet paper strength is improved. The molecular weight, i.e. the weight average molecular weight, of the water-soluble macromolecule used in this case is 10,000 to 5,000,000 and preferably 100,000 to 3,000,000. A weight average molecular weight less than 10,000 is not preferred, because the wet paper strength becomes insufficient. A weight average molecular weight exceeding 5,000,000 is not preferred, because the flocculating power becomes excessively high and this affects the formation of paper.

Examples of the paper product to which the flocculation treatment agent of the present invention is applied include tissue paper and paper towels. The flocculation treatment agent can also be applied to paper products that are required to have strength when the products are in a water-absorbed state. The pH during papermaking is 3 to 9. However, when a water-soluble macromolecule that dissociates on the alkaline side to form a cationic macromolecule is used together with the flocculation treatment agent, the flocculation treatment agent can be used on a higher pH side. The amount added with respect to the papermaking stock is 0.05 to 2.0% by mass and preferably 0.1 to 0.5% by mass. The addition position is, for example, the machine chest or a point upstream of the fan pump for adding white water. Conventionally used papermaking chemicals as they are may be used without any problem.

In papermaking processes for base paper for coated paper, PPC paper, high-quality paper, paper boards, newsprint, etc., various retention aid systems are used in order to improve the retention of fine fibers, a filler, etc. In a scheme for one conventionally used retention aid system, a high-molecular weight acrylamide-based water-soluble polymer is added upstream and downstream of the fan pump and the screen used in a shearing step during papermaking. However, the retention must be maintained and improved according to changes in papermaking conditions such as an increase in the content of fine fibers in the papermaking stock and an increase in the use ratio of fine particles of calcium carbonate used as a filler. To improve the retention, a two-component retention system in which an inorganic material or an anionic polymer is added downstream of the screen may be used instead of the scheme using a single polymer. For example, in one addition scheme, a high-molecular weight cationic polymer is added upstream of the screen, and bentonite or colloidal silica is added downstream of the screen. In another scheme, a cationic polymer is added upstream of the screen as in the above scheme, and fine anionic organic macromolecular particles are added downstream of the screen. Since the two components are used, it may be necessary to change the addition balance according to the papermaking conditions, and control of the addition balance is complicated. Even when the water-in-oil emulsion including vinylamine of the present invention is used alone, it is expected that the retention is improved sufficiently.

Next, an intrinsic viscosity is used to express the molecular weight of the water-soluble macromolecule obtained by polymerization of the above monomer. The intrinsic viscosity of the water-soluble polymer constituting the water-in-oil emulsion is preferably 10 to 20 dl/g and more preferably 15 to 20 dl/g as measured in a 1N aqueous NaCl solution at 25° C. If the intrinsic viscosity is under 10 dl/g, the retention improving effect becomes low. It is expected that the effect increases as the intrinsic viscosity increases. However, a water-soluble polymer having an intrinsic viscosity higher than 20 dl/g cannot be practically produced. In this case, the weight average molecular weight of the water-soluble macromolecule is 3,000,000 to 10,000,000 and preferably 5,000,000 to 10,000,000. If the weight average molecular weight is less than 3,000,000, the performance of the retention aid is insufficient. A weight average molecular weight higher than 10,000,000 does not cause any problem. However, since the degree of polymerization of the vinylamine-based macromolecule is difficult to increase, a water-soluble polymer having a weight average molecular weight higher than 10,000,000 cannot be produced.

The addition position of the retention aid during the papermaking process using a papermaking chemical comprising the water-in-oil emulsion of the present invention is generally a position upstream or downstream of the fan pump or the screen used in the shearing step. The water-in-oil emulsion of the present invention is added at the same addition position. To improve the retention as much as possible at a small addition ratio, it is preferable to add the retention aid downstream of the screen used in the final shearing step.

In the production of paper in the papermaking industry, neutral papermaking is widespread, and low-cost calcium carbonate can be used as a filler. Therefore, advantages are obtained in that the production cost is reduced and products with higher quality than that of acid paper can be obtained. As neutral papermaking is widespread, more suitable papermaking chemicals are being prevailed. An anionic acidic rosin-based sizing agent has been used in acidic papermaking. However, in neutral papermaking, the amount added of aluminum sulfate used as a fixing agent for the rosin-based sizing agent is reduced, and therefore the degree of fixation is reduced, so that it is in a situation that a high sizing effect is not achieved. Accordingly, cationic sizing agents, alkenyl succinic anhydride sizing agents, and alkyl ketene dimer sizing agents that have no dependence on aluminum sulfate and are self-fixable to pulp fibers have been developed. However, alkenyl succinic anhydride is easily hydrolyzed and therefore must be emulsified with an emulsifier in a papermaking site immediately before the emulsifier and the fixing agent are is used, and management of the alkenyl succinic anhydride is complicated. It has been pointed out that, when an alkyl ketene dimer sizing agent is fixed onto pulp fibers, it takes a long time for the sizing agent to exhibit its sizing effect after the produced paper is dried and that the suitability of the sizing agent for electrophotography and inkjet printing is poor. Unlike the alkenyl succinic anhydride sizing agents and alkyl ketene dimer sizing agents, the management of a rosin-based sizing agent is not complicated. In addition, the suitability of the rosin-based sizing agent for printing is not poor, and a high sizing effect can be achieved. Therefore, there is a demand for the use of a neutral rosin-based size for neutral papermaking. Accordingly, instead of aluminum sulfate conventionally used as the fixing agent for rosin-based sizing agents, various fixing agents for cationic water-soluble macromolecules have been developed. To improve the degree of sizing, the addition ratio of the sizing agent must be increased. However, an unfixed portion of the sizing agent causes pitch trouble such as the occurrence of papermaking defects and stains. Therefore, there is a demand for a more effective size fixing agent.

In the present invention, the water-in-oil emulsion including polyvinylamine of the present invention may be used alone as a fixing agent for the sizing agent. Alternatively, a combination of the water-in-oil emulsion and another papermaking internally-adding chemical agent may be used. Specifically, a filler, a paper strengthening agent, aluminum sulfate, a pitch controlling agent, a dye, a retention aid, a drainage aid, etc. may be used.

When a neutral rosin-based size is applied, aluminum sulfate must be added. However, the use of the vinyl polymerization-based cross-linkable water soluble cationic or amphoteric polymer according to the present invention allows fixability to be improved, so that the addition ratio of aluminum sulfate can be reduced. Aluminum sulfate is generally added in an amount of 1.5 to 2% with respect to the amount of the papermaking stock, however the amount added can be reduced to 0.5 to 1.5%.

Preferably, the water-in-oil emulsion including polyvinylamine of the present invention is added together with the rosin-based sizing agent or after the addition of the rosin-based sizing agent. It is not preferable to add the water-in-oil emulsion before the addition of the rosin-based sizing agent, because the water-in-oil emulsion is consumed by anionic impurities (anionic trash) and anionic papermaking chemicals in the pulp fibers and the papermaking stock. The weight average molecular weight of the polyvinylamine used is 1,000,000 to 10,000,000 and preferably 2,000,000 to 6,000,000. If the weight average molecular weight is less than 1,000,000, the size fixation performance is insufficient.

No particular limitation is imposed on the papermaking stock used for papermaking, and the water-in-oil emulsion can be used for newsprint, high-quality paper, PPC paper, base paper for coated paper, lightweight coated paper, paper boards, etc.

EXAMPLES

The present invention will next be described in more detail by way of Examples. However, the present invention is not limited to the following Examples, so long as the gist of the invention is not changed.

(Production 1 of Water-in-Oil Emulsion of poly-n-vinylcarboxylic acid amide) A 500 ml four-necked separable flask equipped with a stirrer, a reflux condenser tube, a thermometer, and a nitrogen introduction tube was charged with 185.6 g of isoparaffin having a boiling point of 190° C. to 230° C. and 13.0 g of a nonionic surfactant, Hypermer H1084 manufactured by Croda) was dissolved in the isoparaffin. Separately, 166.4 g of N-vinylformamide (purity: 99.8% by mass), 0.16 g of sodium formate, and 134.9 g of ion exchanged water were collected and added. The aqueous solution and the oil were mixed and emulsified for 2 minutes under stirring using a homomixer at 8,000 rpm. While the obtained emulsion was stirred, the temperature of the monomer solution was maintained in the range of 20 to 25° C., and inside air was replaced with nitrogen for 30 minutes. Then 0.83 g (0.5% by mass with respect to the monomer) of a polymerization initiator, 2,2'-azobis(4-methoxy-2,4-dimethylvaleronitrile), (V-70, manufactured by Wako Pure Chemical Industries, Ltd.) was added to initiate a polymerization reaction. While the temperature was maintained in the range of 20 to 25° C., the polymerization was performed for 12 hours to complete the reaction. The product is referred to as PNVF-1.

(Production 2 of Water-in-Oil Emulsion of poly-n-vinylcarboxylic acid amide)

A water-in-oil emulsion of poly-N-vinylcarboxylic acid amide was produced by the same method as in (Production 1 of water-in-oil emulsion of poly-N-vinylcarboxylic acid amide) except that 0.16 g of sodium formate was changed to 1.66 g of sodium hypophosphite and 133.4 g of ion exchanged water was used. The product is referred to as PNVF-2.

Example 1

252.6 g of PNVF-1 and 12.6 g of polyoxyethylene stearyl ether (EMULGEN 306P (HLB: 9.4), manufactured by Kao Corporation) were collected into a 500 mL four-necked separable flask equipped with a stirrer, a reflux condenser tube, a thermometer, and a dropping funnel, and the mixture was stirred at 50° C. to sufficiently dissolve and mix the polyoxyethylene stearyl ether. After confirmation of dissolution, the mixture was heated to 80° C., and 12.6 g of an aqueous solution of 20% by mass of hydroxylamine hydrochloride was added. Then 98.7 g of an aqueous sodium hydroxide solution (purity: 48% by mass) was added dropwise through the dropping funnel over 1 minute, and a hydrolysis reaction was performed at 80° C. for 8 hours. After completion of the hydrolysis reaction, 123.5 g of an aqueous hydrochloric acid solution (purity: 35% by mass) was added through the dropping funnel to neutralize the mixture. After neutralization, 20 g of polyoxyethylene alkyl ether (HLB: 13.3) was added to thereby obtain a water-in-oil emulsion of polyvinylamine. The obtained water-in-oil emulsion is referred to as sample-1. The pH of sample-1 at a concentration of 1% by mass was measured, and the form of sample-1 immediately after production and the form in 30 days after production (stored at 25° C.) were determined. The weight average molecular weight of sample-1 was measured by a static light scattering method, and its degree of amination was measured by a colloidal titration method. The results are shown in TABLE-1.

Example 2

A water-in-oil emulsion of polyvinylamine was obtained in the same manner as in Example 1 except that neutralization by an aqueous hydrochloric acid solution was not performed. The obtained water-in-oil emulsion is referred to as sample-2. The intrinsic viscosity of sample-2 in a 1 mol/L aqueous NaCl solution at 25° C., the pH of sample-2 at a concentration of 1% by mass, and its form immediately after production and in 30 days after production (stored at 25° C.) are shown in TABLE-1.

Example 3

A water-in-oil emulsion of polyvinylamine was obtained in the same manner as in Example 2 except that 98.7 g of an aqueous sodium hydroxide solution (purity: 48% by mass) was changed to 123.5 g of an aqueous hydrochloric acid solution (purity: 35% by mass). The obtained water-in-oil emulsion is referred to as sample-3. The intrinsic viscosity of sample-3 in a 1 mol/L aqueous NaCl solution at 25° C., the pH of sample-3 at a concentration of 1% by mass, and its form immediately after production and in 30 days after production (stored at 25° C.) are shown in TABLE-1.

Example 4

A water-in-oil emulsion of polyvinylamine was obtained in the same manner as in Example 1 except that the polyoxyethylene stearyl ether (EMULGEN 306P (HLB: 9.4), manufactured by Kao Corporation) was changed to polyoxyethylene oleyl ether (EMULGEN 409PV (HLB: 12.0), manufactured by Kao Corporation). The obtained water-in-oil emulsion is referred to as sample-4. The intrinsic viscosity of sample-4 in a 1 mol/L aqueous NaCl solution at 25° C., the pH of sample-4 at a concentration of 1% by mass, and its form immediately after production and 30 days after production (stored at 25° C.) are shown in TABLE-1.

Example 5

A water-in-oil emulsion of polyvinylamine was obtained in the same manner as in Example 1 except that PNVF-1 was changed to PNVF-2. The obtained water-in-oil emulsion is referred to as sample-5. The intrinsic viscosity of sample-5 in a 1 mol/L aqueous NaCl solution at 25° C., the pH of sample-5 at a concentration of 1% by mass, and its form immediately after production and in 30 days after production (stored at 25° C.) are shown in TABLE-1.

Example 6

252.6 g of PNVF-1 and 12.6 g of polyoxyethylene stearyl ether (EMULGEN 306P (HLB: 9.4), manufactured by Kao Corporation) were collected into a 500 ml four-necked separable flask equipped with a stirrer, a reflux condenser tube, a thermometer, and a gas blowing port, and the mixture was stirred at 50° C. to sufficiently dissolve and mix the polyoxyethylene stearyl ether. After confirmation of dissolution, the mixture was heated to 80° C., and 12.6 g of an aqueous solution of 20% by mass of hydroxylamine hydrochloride was added. 20.2 g of ammonia gas was blown from the gas blowing port and allowed to be absorbed, and then a hydrolysis reaction was performed at 80° C. for 8 hours. After completion of the hydrolysis reaction, 86.4 g of an aqueous hydrochloric acid solution (purity: 35% by mass) was added to neutralize the mixture. After neutralization, 15.4 g of polyoxyethylene alkyl ether (HLB: 13.3) was added to thereby obtain a water-in-oil emulsion of polyvinylamine. The obtained water-in-oil emulsion is referred to as sample-6. The intrinsic viscosity of sample-6 in a 1 mol/L aqueous NaCl solution at 25° C., the pH of sample-6 at a concentration of 1% by mass, and its form immediately after production and in 30 days after production (stored at 25° C.) are shown in TABLE-1.

Example 7

A water-in-oil emulsion of polyvinylamine was obtained in the same manner as in Example 6 except that 20.2 g of ammonia gas was changed to 30.3 g of hydrogen chloride gas and no neutralization was performed after production. The obtained water-in-oil emulsion is referred to as sample-7. The intrinsic viscosity of sample-7 in a 1 mol/L aqueous NaCl solution at 25° C., the pH of sample-7 at a concentration of 1% by mass, and its form immediately after production and in 30 days after production (stored at 25° C.) are shown in TABLE-1.

Comparative Example 1

The reaction was performed in the same manner as in Example is 2 except that the polyoxyethylene stearyl ether (EMULGEN 3060 (HLB: 9.4), manufactured by Kao Corporation) was not added. However, solidification occurred during the hydrolysis reaction, and a stable water-in-oil emulsion of polyvinylamine was not obtained. The product is referred to as comparison-1, and its form immediately after production and in 30 days after production (stored at 25° C.) are shown in TABLE-1.

Comparative Example 2

A water-in-oil emulsion of polyvinylamine was obtained in the same manner as in Example 3 except that the polyoxyethylene stearyl ether (EMULGEN 306P (HLB: 9.4), manufactured by Kao Corporation) was not added. The obtained water-in-oil emulsion is referred to as comparison-2. The intrinsic viscosity of comparison-2 in a 1 mol/L aqueous NaCl solution at 25° C., the pH of comparison-2 at a concentration of 1% by mass, and its form immediately after production and in 30 days after production (stored at 25° C.) are shown in TABLE-1.

Comparative Example 3

The reaction was performed in the same manner as in Example 1 except that the polyoxyethylene stearyl ether (EMULGEN 306P (HLB: 9.4), manufactured by Kao Corporation) was changed to polyoxyethylene sorbitan monostearate (RHEODOL TW-S106V, manufactured by Kao Corporation). However, solidification occurred during the hydrolysis reaction, and a stable water-in-oil emulsion of polyvinylamine was not obtained. The product is referred to as comparison-3, and its form immediately after production and 30 days after production (stored at 25° C.) are shown in TABLE-1.

Comparative Example 4

The reaction was performed in the same manner as in Example 1 except that the polyoxyethylene stearyl ether (EMULGEN 306P (HLB: 9.4), manufactured by Kao Corporation) was changed to polyoxyethylene stearyl ether (EMULGEN 350 (HLB: 17.8), manufactured by Kao Corporation). However, solidification occurred immediately after the addition of the polyoxyethylene stearyl ether, and a stable water-in-oil emulsion of polyvinylamine was not obtained. The product is referred to as comparison-4.

TABLE 1

| | Hydrolysis Base/ Acid | Coexisting Surfactant | Weight Average Molecular Weight | pH of Aqueous Solution | Rate of Amination | Form Immediately After Production | Form in 30 Days After Production |
|---|---|---|---|---|---|---|---|
| Sample-1 | NaOH (aq) | EMULGEN 306P | 640 | 6.8 | 36 | Liquid EM | Liquid EM |
| Sample-2 | NaOH (aq) | EMULGEN 306P | 600 | 14 | 57 | Liquid EM | Liquid EM |
| Sample-3 | HCl (aq) | EMULGEN 306P | 540 | 0.5 | 68 | Liquid EM | Solid Precipitate |
| Sample-4 | NaOH (aq) | EMULGEN 409PV | 400 | 6.8 | 45.0 | Liquid EM | Liquid EM |
| Sample-5 | NaOH (aq) | EMULGEN 306P | 100 | 6.8 | 88 | Liquid EM | Liquid EM |
| Sample-6 | NH$_3$ (g) | EMULGEN 306P | 700 | 8.1 | 52 | Liquid EM | Liquid EM |
| Sample-7 | HCl (g) | EMULGEN 306P | 230 | 0.5 | 75 | Liquid EM | Solid Precipitate |

TABLE 1-continued

| | Hydrolysis Base/ Acid | Coexisting Surfactant | Weight Average Molecular Weight | pH of Aqueous Solution | Rate of Amination | Form Immediately After Production | Form in 30 Days After Production |
|---|---|---|---|---|---|---|---|
| Comparative-1 | NaOH (aq) | NONE | NOT MEASURABLE | NOT MEASURABLE | — | Solidified | Solidified |
| Comparative-2 | HCl (aq) | NONE | 550 | 0.5 | 60 | Liquid EM | Solidified |
| Comparative-3 | NaOH (aq) | RHEODOL TW-S106V | NOT MEASURABLE | NOT MEASURABLE | — | Solidified | Solidified |
| Comparative-4 | NaOH (aq) | EMULGEN 350 | NOT MEASURABLE | NOT MEASURABLE | — | Solidified | Solidified |

NaOH (aq): Aqueous sodium hydroxide solution,
HCl (aq): Aqueous hydrochloric acid solution
$NH_3$ (g): Ammonia gas,
HCl (g): Hydrogen chloride gas
pH of aqueous solution: pH of a 1.0% by mass aqueous solution 30 minutes after dissolution,
Rate of amination: Molar ratio (% by mole) relative to N-vinylformamide charged,
Molecular weight: $\times 10^4$ Example 8

Mixed raw sludge (sludge properties, pH: 6.6, SS: 23,800 mg/L) generated in a sewage treatment plant was subjected to a flocculation filtration test using a centrifugal dehydrator and a compression test. 200 mL of the sludge was placed into a 300 mL polypropylene-made beaker. Then a solution of one of sample-1 to sample-4 and sample-6 in TABLE 1 was added in an amount of 0.7% by mass with respect to the solids in the sludge dispersion. The mixture was transferred to another beaker, and this procedure was repeated 20 times to stir the mixture, and was thereby flocculated. Then the size of the flocs was observed, and a beaker with a 60 mesh filter cloth was used to examine the rate of filtration. The flocs after filtration were subjected to press dewatering at a compression pressure of 1 $kgf/cm^2$ for 30 seconds, and then the water content of the dewatered cake was determined. The results are shown in TABLE 2.

Comparative Example 5

Comparison-2 in TABLE 1, comparison-5 (acrylamide/acryloyloxyethyltrimethylammonium chloride=a 40% by mole/60% by mole copolymer, weight average molecular weight: 6,000,000), and comparison-6 (commercial polyvinylamine powder, neutralized with hydrochloric acid, the degree of amination relative to N-vinylformamide: 55% by mole, weight average molecular weight: 5,500,000) were tested. The results are shown in TABLE 2.

TABLE 2

| | Sample Name | Floc Diameter | Amount of Filtrate After 20 Seconds | Water Content |
|---|---|---|---|---|
| Example 8 | | | | |
| 1 | Sample-1 | 1.5 | 155 | 72.4 |
| 2 | Sample-2 | 1.9 | 180 | 71.5 |
| 3 | Sample-3 | 1.8 | 170 | 71.8 |
| 4 | Sample-4 | 1.6 | 167 | 72.0 |
| 5 | Sample-6 | 1.9 | 185 | 71.6 |
| Comparative Example 5 | | | | |
| 1 | Comparative-2 | 1.5 | 153 | 74.6 |
| 2 | Comparative-5 | 1.8 | 175 | 73.8 |
| 3 | Comparative-6 | 1.2 | 148 | 75.5 |

Floc diameter: mm,
Amount of filtrate: mL,
Water content: % by mass

It was found that the sludge dewatering agents comprising the water-in-oil emulsions of the present invention showed effects at least comparable to those of the commercial polyvinylamine powder. In sample-1 in which the degree of amination was low, its effects were slightly low.

Example 9

A 300 mL beaker was charged with 200 mL of a dye solution (containing 50 ppm of direct dye, Alphanol Fast Brilliant Red), and one of sample-4, sample-5, and sample-7 in TABLE 1 was added in an amount of 50 ppm or 100 ppm with respect to the dye solution. The mixture was stirred using a stirrer at 100 rpm for 60 seconds, and then aluminum sulfate was added in an amount of 100 ppm with respect to the mixture. The resultant mixture was stirred 60 seconds, and finally an anionic flocculant (degree of anionization: 20% by mole, polyacrylamide, weight average molecular weight: 12,000,000) was added in an amount of 1 ppm with respect to the mixture. The resultant mixture was stirred for 60 seconds and then left to stand for 60 seconds. Then the absorbance of the supernatant was measured using a spectrophotometer (UV1600, manufactured by Shimadzu Corporation, a wavelength of 660 nm was used for the measurement). The rate of decolorization is a value obtained by subtracting from 100(%) the absorbance of the supernatant of the treated solution divided by the absorbance of the dye solution before the treatment. The results are shown in TABLE 3.

Comparative Example 6

The same procedure as in Example 9 was repeated to test comparison-7 (dicyandiamide/formalin condensate), comparison-8 (dimethylamine/pentaethylenehexamine/epichlorohydrin condensate, weight average molecular weight: 500,000), and comparison-6 (commercial vinylamine powder, neutralized with hydrochloric acid, the degree of amination relative to N-vinylformamide: 65% by mole, weight average molecular weight: 3,000,000). The results are shown in TABLE 3.

TABLE 3

| | | Rate of Decolorization | |
|---|---|---|---|
| | Sample Name | Amount Added: 50 | Amount Added: 100 |
| Example 9 | | | |
| 1 | Sample-4 | 96.5 | 97.6 |
| 2 | Sample-5 | 97.7 | 98.8 |
| 3 | Sample-7 | 97.0 | 98.0 |

TABLE 3-continued

| | | Rate of Decolorization | |
|---|---|---|---|
| | Sample Name | Amount Added: 50 | Amount Added: 100 |
| Comparative Example 6 | | | |
| 1 | Comparative-7 | 90.2 | 96.3 |
| 2 | Comparative-8 | 88.1 | 91.5 |
| 3 | Comparative-9 | 89.0 | 94.5 |

Amount added: ppm with respect to solution,
Rate of decolorization: %

It was found that the dye effluent treatment agents comprising the water-in-oil emulsions of the present invention showed effects at least comparable to those of the commercial polyvinylamine powder. The dye effluent treatment agents showed higher effects than those of comparison-7 (dicyandiamide/formalin condensate) and comparison-8 (dimethylamine/pentaethylenehexamine/epichlorohydrin condensate).

Example 10

1,000 mL of activated sludge having an MLSS concentration of 3,500 mg/L and an SVI of 250 (mL/g) and having low sedimentability that caused outflow trouble in a sedimentation tank was collected from an aeration tank into a 1,000 mL graduated cylinder. One of sample-4, sample-5, and sample-7 in TABLE 1 was added in an amount of 7 mg/L with respect to the activated sludge dispersion. The mixture was stirred by inverting the graduated cylinder 5 times and then left to stand. To compare the sedimentability of the activated sludge dispersions, the volume above a sedimentation interface (the volume of a non-sedimented dispersed region) after 5 minutes was measured. The results are shown in TABLE 4.

Comparative Example 7

The same procedure as in Example 10 was repeated to add, to the activated sludge, one of a polyamine-based coagulant (comparison-8, weight average molecular weight: 500,000), a dimethyldiallylammonium chloride polymer (comparison-9, weight average molecular weight: 500,000), and a polymer-based macromolecular flocculant in a powder form (comparison-10, an acryloyloxyethyltrimethylammonium chloride/acrylamide copolymer, cationic copolymerization rate: 70% by mole, weight average molecular weight: 1,000,000) in an amount of 7 mg/L with respect to the activated sludge dispersion. To compare the sedimentability of the activated sludge dispersions, the volume above the sedimentation interface (the volume of the non-sedimented dispersed region) after 5 minutes was measured. The polyamine-based coagulant and the diallylammonium salt-type coagulant were added as they are, and the power macromolecular flocculant was added in the form of a 0.2% by mass aqueous solution. The results are shown in TABLE 4.

TABLE 4

| | Sample Name | Amount Added | Volume of Supernatant after Standing for 5 min. |
|---|---|---|---|
| Example 10 | | | |
| 1 | Sample-4 | 7 | 500 |
| 2 | Sample-5 | 7 | 460 |
| 3 | Sample-7 | 7 | 400 |

TABLE 4-continued

| | Sample Name | Amount Added | Volume of Supernatant after Standing for 5 min. |
|---|---|---|---|
| Comparative Example 7 | | | |
| 1 | Comparative-8 | 7 | 230 |
| 2 | Comparative-9 | 7 | 300 |
| 3 | Comparative-10 | 7 | 320 |
| 4 | Not Added | — | 180 |

Amount added: With respect to sludge dispersion (mg/L),
Volume above sedimentation interface (mL)

It was found that the sludge settling agents comprising the water-in-oil emulsions of the present invention showed higher effects than those of comparisons-8 to 10.

Example 11

In a recycled pulp production process in which deinking treatment was performed on newspaper and leaflets used as a wastepaper stock, a pulp slurry was collected from an inlet of a flotator and subjected to a deinking test using an experimental flotation tester. In the deinking step in which the slurry was collected, 1.5 g of sodium hydroxide, 3 g of sodium silicate, and 0.3 g of a higher alcohol-based deinking agent were added to 100 g of the wastepaper stock in a pulper, and 3.3 g of hydrogen peroxide was added at an inlet of a kneader. The pulp slurry had a suspended solids concentration of 7,200 mg/L, a pitch concentration of 850 mg/L, an ash content of 1,800 mg/L, an ash ratio of 27% by mass relative to the solids in the slurry, and a pH of 9.7. The collected pulp slurry was held at 30° C., and one of sample-4, sample-5, and sample-7 of the water-soluble macromolecule of the present invention produced in the Synthesis Examples was added in an amount of 30 mg/L relative to the pulp slurry. Then the mixture was treated using the flotation tester for 2.5 minutes. The results are shown in TABLE 5.

The pulp concentration was computed by subtracting the concentration of inorganic components. The amount of froth was subtracted from the amount of the collected slurry, and the resultant value was used as the net amount of the collected pulp. The net amount of the collected pulp was used as a baseline, and the yield of the pulp was computed. The amount of the pitch in the recycled paper slurry was determined by extracting the pitch with chloroform. The Whiteness of the obtained deinked recycled paper was determined as follows. Paper was made using a hand papermaking sheet machine. After the paper was dried, the Whiteness was measured using a Hunter whiteness tester. Then a comparison of the Whiteness was made. The results are shown in TABLE 5.

Comparative Example 8

The same procedure as in Example 11 was repeated to test comparison-11 (dimethyldiallylammonium chloride polymer, weight average molecular weight: 500,000) and comparison-12 (methacryloyloxyethyltriammonium chloride polymer, weight average molecular weight: 1,000,000). The results are shown in TABLE 5.

TABLE 5

| Sample Name | Added Amount | Yield of Recycled Paper | Pitch Concentration | Whiteness | Ash Content in Deinked Recycled Paper |
|---|---|---|---|---|---|
| Example 11 | | | | | |
| 1 Sample-4 | 30 | 93.5 | 280 | 71.0 | 10.5 |
| 2 Sample-5 | 30 | 90.1 | 235 | 73.5 | 8.0 |
| 3 Sample-7 | 30 | 90.5 | 220 | 74.5 | 9.8 |
| Comparative Example 8 | | | | | |
| 1 Comparative-11 | 30 | 86.0 | 315 | 68.0 | 15.0 |
| 2 Comparative-12 | 30 | 83.5 | 340 | 62.3 | 14.1 |
| 3 Not Added | — | 77.9 | 600 | 60.5 | 13.0 |

Amount added: mg/L, Yield of recycled paper: %,
Pitch concentration: mg/L, Whiteness of recycled paper: Using Hunter whiteness tester,
Ash content of recycled paper: % by mass It was found that the deinking aids comprising the water-in-oil emulsions of the present invention and used for the deinked recycled paper production process showed effects at least comparable to those of comparison-11 (dimethyldiallylammonium chloride polymer) and comparison-12 (methacryloyloxyethyltriammonium chloride polymer).

Example 12

Addition of Chemical and Production of Wet Sheet

A papermaking stock for liner base paper (composed mainly of used corrugated cardboards) was used as a test papermaking stock. One of sample-4, sample-5, and sample-7 of the water-soluble macromolecule used in the present invention was added to the stock in an amount of 0.03% with respect to the dry papermaking stock, and the mixture was stirred for 1 minute. Then the mixture was filtrated through a circular paper filter with a diameter of 90 mm (Whatman No. 41, particles of 20 to 25 μm or more were held) for 5 minutes. The paper filter was peeled off from the stock after filtration, and a separated wet sheet was used. The surface of the separated wet sheet that did not face the paper filter was used as a measurement surface. The amount of the filtrate was determined by calculating the concentration of the stock used so that the obtained wet sheet has a basis weight of 150 g/m² in an area with a diameter of 90 mm, and collected. The wet sheet in which the surface not in contact with the paper filter was used as the measurement surface was laminated on a SUS plate to transfer adhesive objects on the measurement surface to the medium. Then, a thick paper filter was laminated on the surface of the wet sheet that was opposite to the surface adhering to the SUS plate (thickness: 0.1 mm), and the laminate was placed in a press machine to apply a pressure of 410 KPa for 5 minutes.

Next, the SUS plate with the wet sheet laminated thereon was placed in a rotary dryer and heated at 105° C. for 6 minutes. In this case, the SUS plate was placed on a cylinder side of the rotary dryer, and the transferred wet sheet was placed on a felt side.

(Total Amount and Total Number of Transferred Adhesive Objects)

After heating, 20 portions were arbitrarily selected on the surface (diameter: 90 mm) of the SUS plate to which adhesive objects from the wet sheet adhered, and images of the selected regions under a stereoscopic microscope were taken using a digital camera and stored in a computer. Then image processing software (IMAGE-PRO PLUS Ver. 5.0, Media Cybernetics, Inc.) was used to adjust the range settings of RGB values, and target particles were extracted. Extraction was again performed on the extracted adhering objects under the optimal conditions for size, the ratio of semimajor to semiminor axes, the number of pores, and the area of pores to thereby distinguish adhesive pitch from fibers and other adhering objects. The extracted particles were used to measure the total area of the adhesive pitch and the total number of the particles, and the results were converted to values per 1 m². The results are shown in TABLE 6.

Comparative Example 9

The above test was performed on Comparison-12 (methacryloyloxyethyltriammonium chloride polymer, weight average molecular weight: 1,000,000) and comparison-8 (dimethylamine/pentaethylenehexamine/epichlorohydrin condensate, weight average molecular weight: 5,000). The results are shown in TABLE 6.

TABLE 6

| | Sample Name | Measured Item (unit) | | | |
|---|---|---|---|---|---|
| | | Number of Thermally Transferred Adhesive Pitch pieces/m² | Total Area of Thermally Transferred Pitch mm/m² | Cationic Demand of Filtrate μeq/L | Turbidity NTU |
| Example 12 | | | | | |
| 1 | Sample-4 | 69000 | 3400 | 36 | 350 |
| 2 | Sample-5 | 60000 | 2900 | 30 | 300 |
| 3 | Sample-7 | 61000 | 3000 | 33 | 340 |

TABLE 6-continued

|  | Sample Name | Number of Thermally Transferred Adhesive Pitch pieces/m² | Total Area of Thermally Transferred Pitch mm/m² | Cationic Demand of Filtrate μeq/L | Turbidity NTU |
|---|---|---|---|---|---|
| Comparative Example 9 | | | | | |
| 1 | Comparative-8 | — | 4800 | 47 | 460 |
| 2 | Comparative-12 | 121000 | 5100 | 52 | 500 |
| 3 | Not Added | 150000 | 6000 | 57 | 550 |

It was found that, with the coagulants comprising the water-in-oil emulsions of the present invention, the number of adhesive pitch and the total area of the adhesive pitch were reduced and therefore high effects of reducing coarse adhesive pitch were obtained. However, in comparison-12 and comparison-8, although turbidity and cationic demand were reduced, the results of the measurement of coarse adhesive pitch by the thermal transfer method showed that the reduction effects were lower than those by the water-soluble macromolecules of the present invention.

Example 13

Leaf bleached kraft pulp (LBKP) was beaten such that its Canadian standard freeness was 400 mL and was used to prepare a pulp slurry with a concentration of 0.75%. One of the above-prepared sample-4, sample-5, and sample-7 was added to the pulp slurry in an amount of 0.3% or 0.6% in terms of solids with respect to the dry weight of the pulp. After the mixture was stirred for 1 minute, paper was made using a TAPPI standard hand papermaking machine. The obtained paper was subjected to press-dewatering and then dried at 110° C. for 4 minutes to obtain handmade paper having a square meter basis weight of 60±1 g/m². The wet breaking length of the obtained paper was measured according to JIS-P8135. The results are shown in TABLE 7.

Comparative Example 10

The same procedure as in Example 13 was repeated to test comparison-13 (polyamine polyamide/epichlorohydrin modified resin) and comparison-14 (commercial polyvinylamine powder, neutralized with hydrochloric acid, the degree of amination in terms of N-vinylformamide: 75% by mole, molecular weight 2,000,000). The results are shown in TABLE 7.

TABLE 7

|  | Sample Name | Wet Breaking Length | |
|---|---|---|---|
|  |  | 0.30% | 0.60% |
| Example 13 | | | |
| 1 | Sample-4 | 0.75 | 0.85 |
| 2 | Sample-5 | 0.72 | 0.83 |
| 3 | Sample-7 | 0.74 | 0.83 |
| Comparative Example 10 | | | |
| 1 | Comparative-13 | 0.83 | 0.95 |
| 2 | Comparative-14 | 0.67 | 0.75 |
| 3 | Not Added | 0.55 | — |

Addition ratio; % by mass with respect to dry pulp,
Wet breaking length: Km

It was found that the wet paper strengthening agents comprising the water-in-oil emulsions of the present invention showed effects substantially comparable to those of comparison-13 (polyamine polyamide/epichlorohydrin modified resin). In addition, the effects of the wet paper strengthening agents were found to be higher than those of comparison-14 (commercial polyvinylamine powder).

Example 14

Leaf bleached kraft pulp (LBKP) was beaten such that its Canadian standard freeness (CSF) value was 400 mL, and the concentration of a pulp slurry was adjusted to 1% by mass. A prescribed amount of the pulp slurry was collected. Then while the collected pulp slurry was stirred at a stirring speed of 500 rpm, calcium carbonate (TP-121, manufactured by OKUTAMA KOGYO Co., Ltd.) in an amount of 10%, aluminum sulfate in an amount of 1%, a neutral rosin sizing agent (commercial product) in an amount of 0.35%, and one of sample-2, sample-4, sample-5, and sample-7 in an amount of 0.04% with respect to the dry pulp were added at intervals of 10 seconds. The mixture was stirred for 15 seconds after the fixing agent was added. Then a retention aid (cationic polyacrylamide, the degree of cationization: 25% by mole, weight average molecular weight: 15,000,000) was added in an amount of 100 ppm, and the mixture was stirred for 30 seconds. Then a TAPPI standard hand papermaking machine (with a 60-mesh wire) was used to make paper with a basis weight of 60 g/m². The pH during papermaking was 7.0. The wet paper made was subjected to press-dewatering using a press at 4.1 kgf/cm² for 5 minutes and dried using a rotary drum dryer at 105° C. for 3 minutes, and then moisture control was performed for 18 hours under the conditions of 25° C. and RH65%. Then the stockigt sizing degree (JISP8122) and formation index of the paper were measure. The formation index was measured using a "3-D Sheet Analyzer" manufactured by M/K System Inc. The higher this value, the better the formation properties. The results are shown in TABLE 8.

Comparative Example 11

The same procedure as in Example 14 was repeated using the same pulp slurry as in Example 1 to make paper without adding any size fixing agent or by adding one of comparison-15 (commercial product, polydimethyldiallylammonium chloride, weight average molecular weight: 1,000,000) and comparison-16 (commercial polyvinylamine powder, neutralized with hydrochloric acid, the degree of amination in terms of N-vinylformamide: 80% by mole, weight average molecular weight: 2,500,000) in an amount of 0.04% relative to the dry pulp. Then the stockigt sizing degree and formation index of the paper were measure. The results are shown in TABLE 8.

TABLE 8

|   | Sample Name | Stockigt Sizing Degree | Formation Index |
|---|---|---|---|
| Example 14 | | | |
| 1 | Sample-2 | 19 | 58.5 |
| 2 | Sample-4 | 20 | 60.0 |
| 3 | Sample-5 | 26 | 61.2 |
| 4 | Sample-7 | 22 | 60.5 |
| Comparative Example 11 | | | |
| 1 | Comparative-15 | 20 | 60.3 |
| 2 | Comparative-16 | 17 | 58.0 |
| 3 | Not Added | 0 | 63.5 |

It was found that the size fixing agents comprising the water-in-oil emulsions of the present invention showed effects substantially comparable to those of comparison-15 (commercial product, polydimethyldiallylammonium chloride) and comparison-16 (commercial polyvinylamine powder).

Example 15

An LBKP pulp slurry (CSF: 400 mL) of 0.5% by mass was collected such that the basis weight of a paper sheet made was 80 g/m$^2$. While the slurry was stirred, a precipitated calcium carbonate slurry was added in an amount of 30% by mass with respect to the LBKP, and then one of sample-3, sample-4, sample-5, and sample-7 was added in an amount of 0.25% by mass or 0.5% by mass with respect to the pulp. Finally, a high-molecular weight acrylic-based water-soluble macromolecule (polyacrylamide-based, weight average molecular weight: 18,000,000, cation equivalent: 2.09 meq/g) was added as a yield aid in an amount of 0.03% with respect to the pulp.

The resultant pulp was subjected to papermaking using a 1/16 m$^2$ TAPPI standard sheet machine to obtain wet paper. The obtained wet paper was pressed at 3.5 Kg/m$^2$ for 5 minutes and then dried at 100° C. for 2 minutes, and then moisture control was performed under the conditions of 20° C. and 65% RH. The basis weight (g/m$^2$) and thickness (mm) of the paper with a controlled moisture content were measured, and the density of the paper was determined by the basis weight/the thickness. After the tensile strength of the paper was measured, its breaking length was calculated (JIS-P8113). The tensile strength (JAPAN-TAPPI-No. 18-1:2000) was measured using TENSILON-RTC-1210A manufactured by ORIENTEC Co., Ltd. at a transfer rate of 20 mm/min. The ash content of the paper was measured by ashing the paper at 525° C. Another portion of the paper was used to measure ISO brightness (JIS, 8148: 2001) using a brightness meter (spectrophotometer-type colorimeter, Color Touch PC, manufactured by Technidyne corporation). The results are shown in TABLE 9.

Comparative Example 12

The same procedure as in Example 15 was repeated to make paper using one of comparison-17 (commercial polyacrylamide-based amphoteric paper strengthening agent, the degree of cationization: 8% by mole, the degree of anionization: 5% by mole, weight average molecular weight: 3,000,000) and comparison-16 (commercial polyvinylamine powder, neutralized with hydrochloric acid, the degree of amination in terms of N-vinylformamide: 80% by mole, weight average molecular weight: 2,500,000). Then the quality of the paper was measured. The results are shown in TABLE 9.

TABLE 9

|   | Sample Name | Amount Added of Chemical | Thickness (mm) | Density (g/m$^3$) | Whiteness | Breaking Length (km) | Ash Content of Paper (%) |
|---|---|---|---|---|---|---|---|
| Example 15 | | | | | | | |
| 1 | Sample-3 | 0.25 | 0.152 | 0.528 | 90.85 | 6.70 | 26.8 |
|   |          | 0.5  | 0.152 | 0.528 | 90.85 | 7.20 | 27.1 |
| 2 | Sample-4 | 0.25 | 0.152 | 0.528 | 90.85 | 6.80 | 26.7 |
|   |          | 0.5  | 0.152 | 0.528 | 90.85 | 7.23 | 27.5 |
| 3 | Sample-5 | 0.25 | 0.152 | 0.529 | 90.85 | 6.72 | 27.0 |
|   |          | 0.5  | 0.151 | 0.530 | 90.77 | 7.22 | 27.1 |
| 4 | Sample-7 | 0.25 | 0.151 | 0.529 | 90.90 | 6.84 | 26.9 |
|   |          | 0.5  | 0.151 | 0.530 | 90.88 | 7.31 | 27.5 |
| Comparative Example 12 | | | | | | | |
| 1 | Comparative-17 | 0.25 | 0.151 | 0.529 | 90.79 | 6.80 | 27.7 |
|   |                | 0.5  | 0.151 | 0.529 | 90.76 | 7.20 | 26.9 |
| 2 | Comparative-16 | 0.25 | 0.152 | 0.528 | 90.87 | 6.60 | 26.6 |
|   |                | 0.5  | 0.152 | 0.528 | 90.85 | 6.95 | 27.1 |
| 3 | Not Added      | —    | 0.153 | 0.527 | 90.91 | 5.85 | 26.4 |

Thickness: mm, Density: g/m$^3$,
Whiteness: dimensionless,
Breaking length: Km,
Ash content of paper: % by mass relative to paper The paper strengthening agents comprising the water-in-oil emulsions of the present invention showed effects substantially comparable to those of comparison-17 (commercial polyacrylamide-based amphoteric paper strengthening agent). It was also found that the paper strengthening agents showed higher effects than those of comparison-16 (commercial polyvinylamine powder).

Example 16

A test for measuring the retention rate was performed using a Britt dynamic jar tester. A 200-mesh wire was used. The stock used was a newsprint papermaking stock having a solids concentration of 1.0% by mass and containing ash components such as precipitated calcium carbonate in an amount of 35.4% with respect to the solids. The values of the physical properties of the papermaking stock are as follows. The pH is 7.2, and the cationic demand of a filtrate through a Whatman No. 41 paper filter measured using PCD-03 type manufactured by MUTEK Co., Ltd. is 0.004 meq/L. After the papermaking stock was stirred at a stirring rate of 1,500 rpm for 20 seconds, one of sample-1, sample-2, sample-3, and sample-7 was added in an amount of 200 ppm or 400 ppm relative to the solids content of the paper. The mixture was stirred at a stirring rate of 1,500 rpm for 10 seconds, and then a liquid to be filtered was collected and filtered using an ADVANTEC No. 2 paper filer. Then SS was measured, and the total retention rate was measured. Next, the paper filter was ashed at 525° C. for 2 hours, and the ash content retention rate was measured. The results are shown in TABLE 10.

Comparative Example 13

The same procedure as in Example 16 was repeated using the same papermaking stock as in Example 16 to test comparison-18: a high-molecular weight acrylic-based water-soluble macromolecule (polyacrylamide-based, weight average molecular weight: 18,000,000, cation equivalent: 2.09 meq/g) and comparison-19: commercial polyvinylamine powder (molecular weight: 6,000,000, product neutralized with hydrochloric acid, degree of amination in terms of N-vinylformamide: 70% by mole). The results are shown in TABLE 10.

TABLE 10

| | Sample Name | Amount Added (ppm) | Total retention rate (%) | Ach content retention rate (%) |
|---|---|---|---|---|
| Example 16 | | | | |
| 1 | Sample-1 | 200 | 71.8 | 42.5 |
| | | 400 | 74.8 | 44.1 |
| 2 | Sample-2 | 200 | 70.5 | 41.8 |
| | | 400 | 74.0 | 43.5 |
| 3 | Sample-3 | 200 | 70.0 | 40.3 |
| | | 400 | 72.7 | 43.0 |
| 4 | Sample-7 | 200 | 72.0 | 43.2 |
| | | 400 | 75.5 | 45.5 |
| Comparative Example 13 | | | | |
| 1 | Comparative-18 | 200 | 71.5 | 42.0 |
| | | 400 | 75.0 | 45.4 |
| 2 | Comparative-19 | 200 | 68.1 | 38.6 |
| | | 400 | 70.6 | 40.3 |
| 3 | Not Added | — | 60.3 | 31.6 |

It was found that the retention and/or drainage aids comprising the water-in-oil emulsions of the present invention showed effects substantially comparable to those of comparison-18: a high-molecular weight acrylic-based water-soluble macromolecule (polyacrylamide-based). It was also found that the retention and/or drainage aids showed higher effects than those of comparison-19 (commercial polyvinylamine powder).

The invention claimed is:

1. A flocculation treatment agent comprising a water-in-oil emulsion of a water-soluble macromolecule that is produced by subjecting a water-in-oil emulsion of an aqueous poly-N-vinylcarboxylic acid amide solution coexisting with a polyoxyalkylene alkyl ether to hydrolysis in the presence of an acid or base.

2. The flocculation treatment agent comprising a water-in-oil emulsion of a water-soluble macromolecule according to claim 1, characterized in that the hydrolysis is performed in the presence of a base.

3. The flocculation treatment agent comprising a water-in-oil emulsion of a water-soluble macromolecule according to claim 2, characterized in that a water-in-oil emulsion of the aqueous poly-N-vinylcarboxylic acid amide solution is subjected to hydrolysis with the base in the coexistence of the polyoxyalkylene alkyl ether, and thereafter an acid is added thereto.

4. The flocculation treatment agent comprising a water-in-oil emulsion of a water-soluble macromolecule according to claim 1, characterized in that the polyoxyalkylene alkyl ether is added after N-vinylcarboxylic acid amid is polymerized and before the hydrolysis is performed.

5. The flocculation treatment agent comprising a water-in-oil emulsion of a water-soluble macromolecule according to claim 1, characterized in that the polyoxyalkylene alkyl ether is a polyoxyethylene alkyl ether having an HLB in a range of 8.0 to 14.0.

6. The flocculation treatment agent comprising a water-in-oil emulsion of a water-soluble macromolecule according to claim 1, characterized in that a polyvinylamine has an intrinsic viscosity in a 1 mol/L aqueous NaCl solution at 25° C. being in a range of 0.5 to 10.0 (dL/g).

7. The flocculation treatment agent comprising a water-in-oil emulsion of a water-soluble macromolecule according to claim 1, characterized in that a 1% by mass aqueous polyvinylamine solution has a pH in a range of 6.0 to 14.0.

8. A retention and/or drainage aid comprising the water-in-oil emulsion of the water-soluble macromolecule according to claim 1.

9. A coagulant comprising the water-in-oil emulsion of the water-soluble macromolecule according to claim 1.

10. A paper strengthening agent comprising the water-in-oil emulsion of the water-soluble macromolecule according to claim 1.

11. A wet paper strengthening agent comprising the water-in-oil emulsion of the water-soluble macromolecule according to claim 1.

12. A size fixing agent comprising the water-in-oil emulsion of the water-soluble macromolecule according to claim 1.

13. A drinking aid comprising the water-in-oil emulsion of the water-soluble macromolecule according to claim 1.

14. A sludge dewatering agent comprising the water-in-oil emulsion of the water-soluble macromolecule according to claim 1.

15. The sludge dewatering agent according to claim 14, characterized in that a degree of amination of the water-soluble macromolecule is 30 to 80% by mole.

16. A sludge settling agent comprising the water-in-oil emulsion of the water-soluble macromolecule according to claim 1.

17. A dye effluent treatment agent comprising the water-in-oil emulsion of the water-soluble macromolecule according to claim 1.

* * * * *